US005261990A

United States Patent [19]

Galda et al.

[11] Patent Number: 5,261,990

[45] Date of Patent: Nov. 16, 1993

[54] METHOD OF MAKING AN ELONGATE STRIP FOR THE PRODUCTION OF SEALING MEMBERS FOR CONTAINERS

[75] Inventors: Michael P. Galda, Acton; Brian M. Klassen, Burlington; Stephen H. Witt, Smithville, all of Canada

[73] Assignee: Stanpac Inc., Smithville, Canada

[21] Appl. No.: 530,529

[22] Filed: May 30, 1990

Related U.S. Application Data

[62] Division of Ser. No. 162,787, Mar. 2, 1988, abandoned.

[30] Foreign Application Priority Data

Sep. 9, 1987 [CA] Canada .................................. 546450

[51] Int. Cl.[5] .............................................. B32B 31/00

[52] U.S. Cl. .................................... 156/262; 156/548; 156/271; 156/250; 156/230; 215/295; 215/298; 220/257; 220/258; 220/270

[58] Field of Search ............... 156/262, 548, 271, 250, 156/244.25, 230; 215/295, 298; 220/257, 258, 270

[56] References Cited

U.S. PATENT DOCUMENTS

| | | | |
|---|---|---|---|
| 713,824 | 11/1902 | White | 215/298 |
| 902,843 | 11/1908 | Sheppard . | |
| 1,073,071 | 9/1913 | Hall | 215/298 |
| 2,050,248 | 8/1936 | Eisen . | |
| 3,411,419 | 11/1968 | Becker et al. | 156/271 |
| 3,549,440 | 12/1970 | Adcock et al. . | |
| 3,923,198 | 1/1986 | Brochman . | |
| 4,256,528 | 3/1981 | Patterson . | |
| 4,452,842 | 6/1984 | Borges et al. . | |
| 4,514,248 | 4/1985 | Cummings . | |
| 4,565,738 | 6/1986 | Purdy . | |
| 4,579,240 | 4/1986 | Ou-Yang | 215/232 |
| 4,588,465 | 5/1986 | Paciorek . | |
| 4,673,601 | 6/1987 | Lamping et al. . | |
| 4,754,890 | 7/1988 | Ullman . | |
| 4,762,246 | 8/1988 | Ashley . | |

FOREIGN PATENT DOCUMENTS

| | | | |
|---|---|---|---|
| 0135431 | 3/1985 | European Pat. Off. . | |
| 2327161 | 10/1975 | France . | |

*Primary Examiner*—Patrick J. Ryan
*Assistant Examiner*—Merrick Dixon
*Attorney, Agent, or Firm*—Bereskin & Parr

[57] ABSTRACT

A method of making an elongate strip for the production of a sealing member includes, as a first step, applying a plurality of strips of a first adhesive to one of a membrane and a first sheet, the membrane and the first sheet are then bonded together so that composite portions are formed where they are bonded together by the strips of the first adhesive, and separated portions are formed where the membrane and the first sheet are free from one another. The other side of the membrane is then coated with an additional layer of adhesive, for example a hot melt bonding material. Then, sealing members can be cut from the resultant composite elongate strip, with each sealing member having a composite portion in which the membrane and the first sheet are bonded together and a separated portion in which the membrane and the first sheet are free of one another. The free portion of the first sheet then forms a tab, for removal of the sealing member, in use, after it has been bonded to the lip of a container.

23 Claims, 2 Drawing Sheets

METHOD OF MAKING AN ELONGATE STRIP FOR THE PRODUCTION OF SEALING MEMBERS FOR CONTAINERS

This is a division of application Ser. No. 07/162,787 filed Mar. 2, 1988, now abandoned.

FIELD OF THE INVENTION

This invention relates to a sealing member or closure for a container, and more particularly is concerned with a sealing member that includes a tab to facilitate removal of the sealing member.

BACKGROUND OF THE INVENTION

There are known for a wide variety of containers, various seals or closures which are sealed to the container around an opening to close the opening. To open the container, the seal has to be broken, providing an indication that the container has been opened, or possibly tampered with. Such seals or closures are used in a wide variety of containers, eg. bottles of pharmaceuticals, foods, beverages, etc. In some cases their primary function is to provide an element of security, and an indication if the contents have been tampered with. For foods, they are frequently used to seal the foods, so as to maintain the freshness of the food and prevent contamination of the food.

The following U.S. patents all relate in general terms to seals for containers, and were considered during the preparation of this application.

U.S. Pat. No. 713,824 (White)
U.S. Pat. No. 745,195 (Kimsey
U.S. Pat. No. 756,601 (Doremus)
U.S. Pat. No. 830,735 (Olsson)
U.S. Pat. No. 895,719 (Bradley)
U.S. Pat. No. 902,843 (Sheppard)
U.S. Pat. No. 1,073,071 (Hall)
U.S. Pat. No. 2,937,481 (Palmer)
U.S. Pat. No. 3,032,225 (Harding)
U.S. Pat. No. 3,317,068 (Betner)
U.S. Pat. No. 3,632,004 (Grimes)
U.S. Pat. No. 3,900,125 (Wyler)
U.S. Pat. No. 4,044,941 (Knudsen)
U.S. Pat. No. 4,155,439 (Fletcher et al)
U.S. Pat. No. 4,324,601 (Dembicki)
U.S. Pat. No. 4,423,819 (Cummings)
U.S. Pat. No. 4,442,129 (Niwa)
U.S. Pat. No. 4,462,502 (Luenser)
U.S. Pat. No. 4,469,754 (Hoh et al)
U.S. Pat. No. 4,501,371 (Smalley)
U.S. Pat. No. 4,514,248 (Cummings)
U.S. Pat. No. 4,526,562 (Knudsen et al)
U.S. Pat. No. 4,527,703 (Cummings)
U.S. Pat. No. 4,576,297 (Larson)
U.S. Pat. No. 4,579,240 (Ou-Yang)
U.S. Pat. No. 4,588,099 (Diez)
U.S. Pat. No. 4,625,875 (Carr)
U.S. Pat. No. 4,666,052 (Ou-Yang)

The seven earlier patents all relate generally to closures for bottles or containers including a shoulder or annular recess for a disk or card closure or the like, and many of them are particularly concerned with milk bottles. Some of these patents show tabs for assisting removal of the closure, but in general the structures are not suitable for simple, economical mass production, and they are not concerned with seals that can be bonded to the neck of a bottle.

In the White patent, a strip is secured to the disk closure by paste and its ends form tabs for removal of it.

U.S. Pat. No. 745,195 discloses a closure provided with an upper disk secured to the main disk and having a segment removed so it can be grasped. The drawings show a staple securing the two parts together.

U.S. Pat. No. 756,601 forms a tab by folding a single sheet of a certain shape.

In U.S. Pat. No. 830,735, there is disclosed a closure in which an upper disk is mounted over a lower disk and is larger. Whilst it is suggested that any suitable fastening could be employed, only shellac or a staple are disclosed.

U.S. Pat. No. 895,719 discloses a bottle or jar closure including a liftable pull tab in the centre of the disk.

U.S. Pat. No. 902,843 is concerned with a disk provided with a thread for lifting the closure.

The Hall patent again discloses a milk bottle seal, which includes a central flap for lifting the seal. A disadvantage with such an arrangement is the difficulty of bonding the two layers together whilst leaving the flap free.

The Palmer U.S. Pat. No. 2,937,418 is of some interest, as apparently being an early example of induction sealing of the closure to the neck of a bottle. However, it does not address the problem of providing any tab or the like to facilitate removal of the seal.

The Harding U.S. Pat. No. 3,032,225 discloses a combination closure which includes a tear-off cap. This is formed from thin aluminium and includes a tear-off tongue. No discussion is given as to how this would be formed. Experience with such tear-off tongues or tabs for aluminium foil closures indicates that they frequently do not function as intended. Often, instead of enabling the whole closure to be removed, a thin strip is torn from the middle of the closure.

The Betner U.S. Pat. No. 3,317,068 is concerned with tear-open sealed containers, and includes a multi-layer closure with a central pull tab.

The Grimes U.S. Pat. No. 3,632,004 tackles the problem of facilitating the removal of the closure or seal in a different manner. Here, a recess or notch is provided in the neck of the bottle, so that a portion of the closure overhangs it. This does not greatly facilitate removal of the closure. The user has to grasp a relatively small edge portion of the closure, and this is not practical for thin flexible seals. However, the notch is relatively small in width, so that again there is the potential for a foil seal to be torn, rather than removed as a whole.

The Wyler patent discloses a container for a pharmaceutical or cosmetic product with a foil closing the opening. This includes a tear-off flap. However, no great details are given as to how this would be formed.

The Carr et al U.S. Pat. No. 4,625,875 is primarily concerned with a tamper-evident closure. It does show a foil disk provided with a tab. This tab has to be folded over within the cap. No details are given as to how this would be formed or assembled.

The Fletcher et al U.S. Pat. No. 4,159,439 should also be noted. This is the only patent that discusses in detail the production of a flexible end closure with a folded pull tab. As shown in this patent, complex machinery is required to form the closure and fit it to the container. A circular table or platform is provided, on which the containers are placed. The table is then rotated, to move each container through numerous different stations. At each station a different operation is performed. The closure itself is stamped from a strip of foil, and then the tab has to be folded up on top of the main portion of it. A complex sequence is required to mount the closure to the container. To set up such machinery for a particular production run is time consuming and expensive.

Additional problems are encountered with this sort of technique. Firstly, the presence of the inwardly folded tab can affect the sealing by means of induction heating. Induction heating relies upon the generation of currents and hence heat in the foil. The presence of the tab affects the electrical properties locally, and can result in improper sealing. As discussed in an article by Bill Zito in the August 1986 issue of Food and Drug Packaging, the current tends to follows the actual periphery of the tab. Also, the folded tab can stick to the inside of the cap, which then requires a silicone liner or the like. Additionally, the induction sealing technique relies upon the fact that the foil closure is pressed against the neck of the container by the cap. With the folded tab present, there may not be even pressure applied to the foil closure, which again can result in imperfect sealing.

Even if proper sealing is achieved, the tab itself often does not provide for reliable opening of the container. Ideally, the tab and the whole circular foil closure should be removable as one piece. In practice, when the tab is lifted to detach the foil from the bottle or container neck, only the portion of the foil adjacent to the tab becomes detached from the container. Then, the tab simply pulls away a strip of foil across the container. This then leaves the user to manually remove the remaining pieces of the foil. For many uses, it is quite undesirable for the user to have to insert his or her fingers into the neck of the container, as this can result in contamination. Such uses could be pharmaceutical products, and food and beverages dispensed at restaurants.

As suggested by the Fletcher et al patent and many other earlier proposals, a common technique for sealing a foil to the neck of a container is by induction heating. This requires the foil sealing member or closure to be inserted into a cap. The cap is then fitted, usually by screwing onto the neck of the container, so as to press the foil against the neck of the container. The neck of the container is then passed through an induction heater, which induces currents in the foil, melting an appropriate adhesive on the foil, causing it to bond to the neck of the bottle. One step in this process is the fitting of the foil into the cap, and the subsequent fitting of the cap to the neck of the container. For this purpose, the foil closure by itself must be capable of being retained within the cap. For simple aluminium foil sealing members or closures this does not always work perfectly. Aluminium has plastic characteristics; in other words, when the foil is pressed into a screw cap, the edges of the foil can deflect permanently as they pass over the screw threads. The edges of the foil do not snap-back into the grooves of the screw thread. Consequently, the foil can drop out before the cap is fitted to the container neck.

Accordingly, what is desired is a sealing member or closure which can be readily fitted to the neck of a container. It should be capable of being produced simply and economically on conventional machinery, without numerous complex forming operations. Ideally, it should be of uniform thickness throughout, and should be capable of uniform induction heating, so that it can be readily joined to the neck of a bottle by induction heating. Further, it is desirable that at least one edge portion should include elastic, as opposed to plastic properties, so that when inserted into a cap, it will snap-back into the grooves of the screw thread of the cap to retain the sealing member in position prior to induction heating and bonding.

BRIEF SUMMARY OF THE PRESENT INVENTION

In accordance with the present invention, there is provided a method of making an elongate strip for the production of a sealing member, the method comprising the steps of:

(a) applying a plurality of strips of a first adhesive to one of a membrane and a first sheet;

(b) applying the membrane and the first sheet together, whereby they are bonded together by the strips of the first adhesive to form an elongate strip, having composite portions where the membrane and the first sheet are bonded together by the first layer of adhesive and at least one separated portion where the first sheet is free from the membrane;

(c) coating a side of the membrane remote from the first sheet with an additional layer of adhesive; wherein the first layer of adhesive bonds the first sheet and the membrane together so strongly that, for a sealing member cut from the resultant elongate strip and bonded to the lip of a container by the additional layer of adhesive, the first sheet and the membrane can be removed as a unit from the lip of a container to open the container.

The method can include the additional step of cutting sealing members from the elongate strip, with each sealing member including a part of a composite portion and a part of the separated portion, to form a sealing member.

The first sheet can have similar dimensions to the membrane and the first adhesive can be applied as strips of uniform width with parallel edges and parallel to one another. The first sheet can either be continuous, so as to form sealing members having a substantially common periphery for the first sheet and the membrane. Alternatively, as detailed in our earlier application Ser. No. 07/162,787, in the inner sealing member, the first sheet need not have a completely common periphery with the membrane. To this end, the first sheet need not be completely continuous, i.e., portions of it would be removed, at least prior to step (b), so that when sealing members are cut from the resultant elongate strip, the first sheet has a periphery that falls, at least partially, inside the periphery of the membrane. This enables a variety of different tab profiles to be formed.

The sealing member may have the first layer of adhesive extending between opposite parts of the periphery of the membrane and up to a line extending across the membrane between ends of said opposite peripheral parts, the line separating the composite portion from a separated portion including a free tab. Also, a second sheet can be provided, secured to the first sheet by a further layer of adhesive to reinforce the first sheet. These features, may be provided in various combinations.

The surface of the membrane remote from the first sheet is coated with a layer of an adhesive. The term "adhesive" is used in the specification including the claims to mean any adhesive capable of bonding the membrane to the neck of a container, and includes thermoplastics and pressure-sensitive adhesives. Preferably, the adhesive is a hot melt bonding material, and in the specification including the claims, a "hot melt bonding material" means a material which upon heating, for example as a result of induction heating of a metal membrane, melts, to enable the membrane to be bonded to the lip or neck of a container, and encompasses both thermoplastic materials and adhesives.

The present invention also provides a cap in combination with a sealing member as just defined.

DESCRIPTION OF THE DRAWING FIGURES

For a better understanding of the present invention and to show more clearly how it may be carried into effect, reference will now be made, by way of example, to the accompanying drawings, which show a preferred embodiment of the present invention, and in which.

DESCRIPTION OF THE PREFERRED EMBODIMENT

Figure 1:
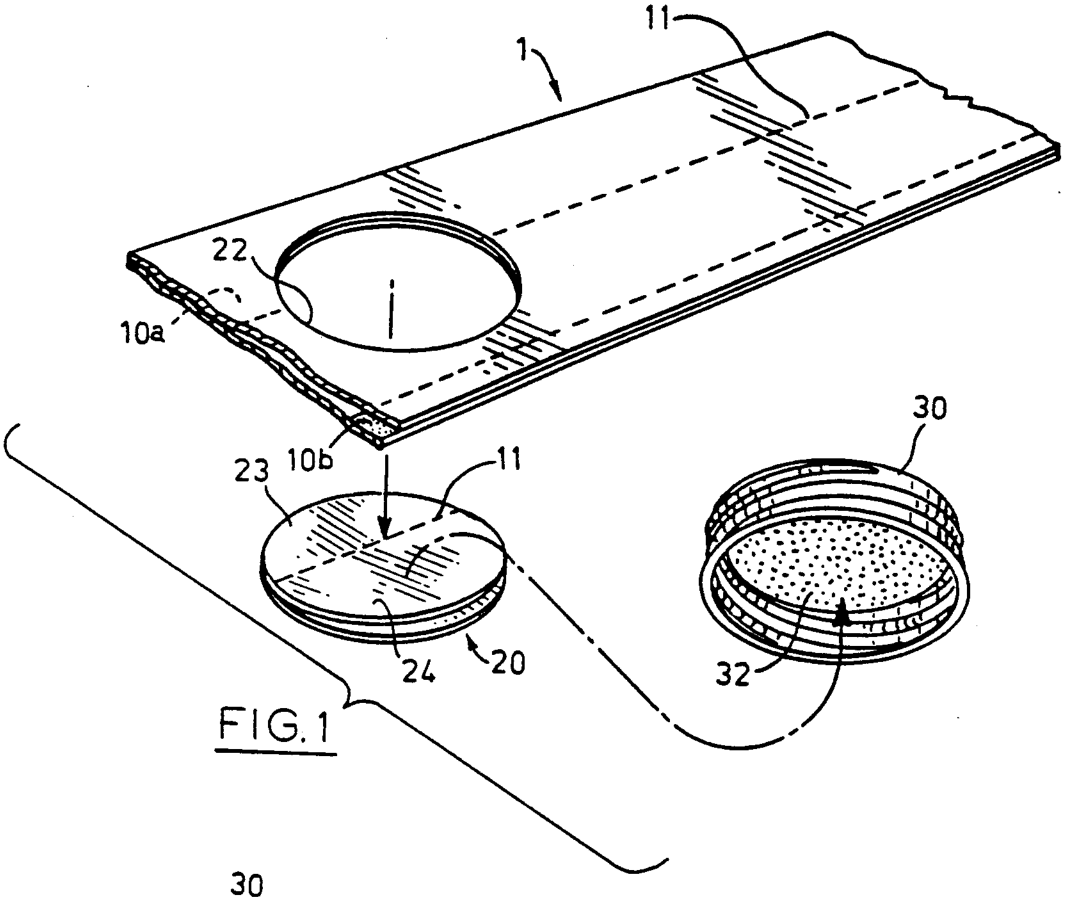
FIG. 1 is a perspective view of an elongate strip according to the present invention, showing a sealing member stamped from the strip and a corresponding cap.
Figure 4:
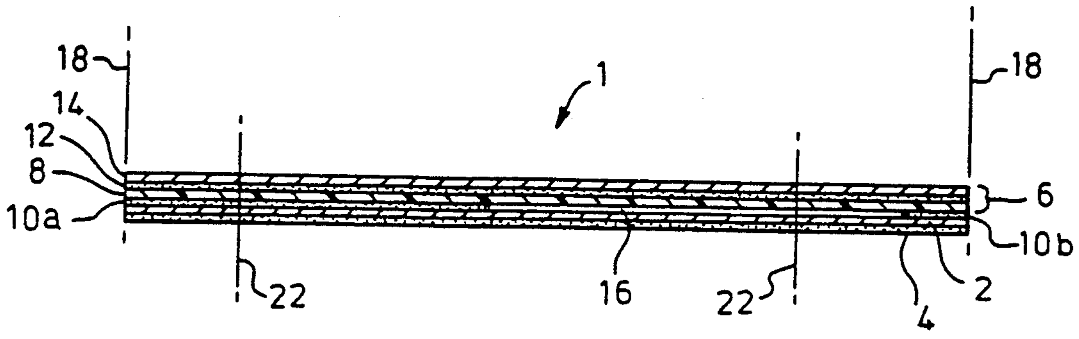
FIG. 4 is a sectional view perpendicular to the axis of the elongate strip of FIG. 1.

With reference to FIGS. 1 and 4, an elongate strip according to the present invention is designated by the numeral 1. As described in greater detail below, the elongate strip 1 can be of indefinite length, and can form part of a wider strip.

The elongate strip 1 has a membrane 2. A lower surface of the membrane 2 is coated with a hot melt bonding material or adhesive 4. A sheet 6 is a laminate sheet comprising a number of separate layers. The sheet 6 has a first sheet 8. Between the first sheet 8 and membrane 2, there is a first layer of adhesive 10. This layer of adhesive 10 does not extend across the full width of the strip 1, as detailed below.

A further layer of adhesive 12 is provided on top of the first sheet 8 and bonds a second sheet 14 to the first sheet 8.

The section through the elongate strip 1, shown in FIG. 4, is constant along its length (for clarity, the thickness of the various layers is amplified in FIG. 4). The first layer of adhesive 10 comprises two portions. A major portion, designated 10*a* extends along the left hand side of the strip as viewed in FIG. 4. A narrow portion 10*b* can extend along the right hand side of the strip 1, again as viewed in FIG. 4. This leaves a gap 16, where the membrane 2 and first sheet 8 are not bonded to one another.

In practice, the elongate strip 1 would be produced as part of a wider strip containing a number of the elongate strips 1. The edges of the elongate strip 1 are defined by the boundaries 18 in FIG. 4, and in the wider strip the elongate strips 1 would be continuous at their boundaries 18. Thus, the wide portion 10*a* would be continuous with the narrow portion 10*b* of an adjacent strip. Appropriate edge regions would be provided along either edge of the wider strip. Thus, typically to accommodate tolerances in the machinery, wider portions 10*a*, 10*b* would be provided along either edge of the wider strip.

Referring to FIG. 1, once the elongate strip has been formed, separate sealing members, designated 20 can be die cut from the strip. Each sealing member is die cut generally centrally from the elongate strip 1 as indicated by the vertical lines 22 in FIG. 4. The sealing member 20 is circular.

The adhesive portion 10*a* has a straight edge or line 11 which in the illustrated embodiment is straight bounding the gap 16. This line 11 extends approximately diametrically across the sealing member 20, as shown in FIG. 1.

The sealing member 20 thus includes a composite portion 23, and a separated portion 24 with the line 11 running between them. In the composite portion, the wide portion 10*a* of the first layer of adhesive results in the various layers being bonded together. In the separated portion 24, the laminate sheet 6 is separate and free from the membrane 2. It should be noted that the sealing member 20 is cut so as to be clear of the narrow portion 10*b* of the adhesive layer. The narrow portion 10*b* is included simply to hold the right hand edges of the membrane 2 and the laminate sheet 6 together to prevent them from flapping or becoming folded etc. In known manner, the various dimensions can be chosen so as to maximize the use of the material. Thus, the narrow portion 10*b* can be kept as narrow as possible, and the width of the strip 1 and the spacing of the sealing members along it can be selected to obtain the maximum number of sealing members 20.

Figure 5:
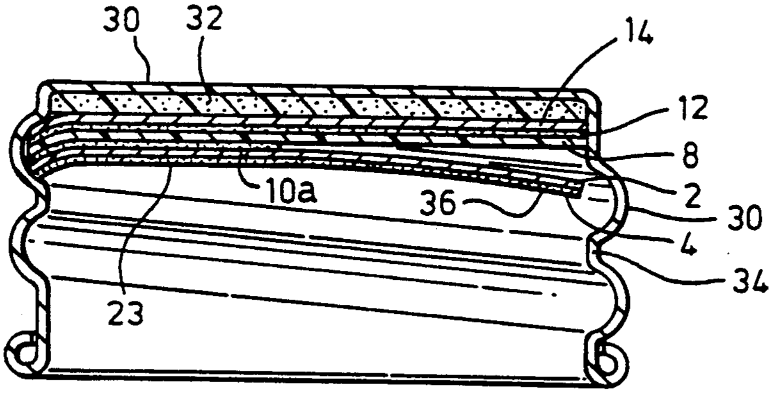
FIG. 5 is a sectional view through a cap fitted with a sealing member of the present invention.

With reference to FIG. 5, a cap for screwing onto a container is shown schematically at 30. The cap 30 is a screw cap, and here is shown as being formed with a uniform wall thickness throughout its planar top wall and cylindrical side wall having a screw thread 34. Within the cap 30, there is a disc 32 of expanded polystyrene or the like, so as to provide a resilient cushioning member. The sealing member 20 is pressed into the cap 30, and is shown in FIG. 5 with the composite and separated portions 23, 24 on the left hand and right hand sides of the figure respectively.

As detailed below, for this usage the membrane 2 is formed from alumium foil, the first sheet 8 from polyester and the second sheet 14 from paper.

As the sealing member 20 is pressed into the cap 30, the edges of the member 20 will ride over the ridges of the screw thread 34 of the cap 30. The resiliency of the sheet 8 is sufficient to overcome the properties of the membrane 2. The second sheet 14 does not greatly influence the resiliency of the sealing member 20. Consequently, as the edges of the sealing member 20 ride over the ridges 34, the periphery of the first sheet 8 deflects, but tends to spring back to maintain its planar configuration. When the sealing member 20 is fully inserted, as shown in FIG. 5, the composite portion 23 springs back to engage the grooves of the screw thread 34. Similarly, for the separated portion 24, the laminate sheet 6 springs back to engage the grooves of the screw thread. However, the membrane 2, of the separated portion 24 is not bonded to the sheet 8. Consequently, as it rides over the ridges 34 its edge deflects plastically, so as to be permanently deformed. This is indicated at 36. As a consequence, the membrane 2 in the separated portion 24 does not engage the screw threads. However, the engagement by the rest of the sealing member 20 holds the sealing member 20 in position.

Figure 2:
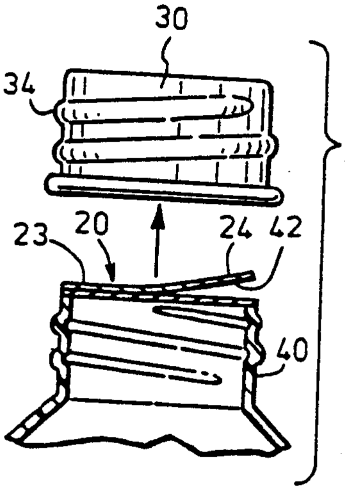
FIG. 2 is a side view showing a section through the neck of a container including a sealing member according to the present invention, and a cap shown removed.

The cap 30 is then screwed on to the neck of a bottle, indicated at 40 in FIG. 2 after filling of the bottle or other container. The cap 30 is screwed on sufficiently, to press the sealing member 20 uniformly against the top of the neck 40. The deformed edge 36 is then pressed against the laminate sheet 6 and conforms to the neck of the container. As there is no tab or other feature providing a varying thickness in the sealing member 20, the disk 32 enables a uniform pressure to be applied over the sealing member 20, so that a uniform pressure should be applied at all points between the sealing member 20 and neck 40.

In known manner, the bottle neck 40 with the cap 30 is then passed through an induction heating apparatus. This uses high frequency fields to induce currents within the foil of the membrane 2. This heats the foil 2. The heat in turn causes the hot melt bonding material 4 to melt, and upon cooling it bonds the membrane to the top of the bottle neck 40.

The bottle is then ready for distribution, sale, etc.

In use, to open the bottle, the user removes the screw cap 30 in the usual way. This then reveals the sealing member 20 bonded to the bottle 40. On one side, the laminated sheet 6 of the separated portion 24 forms a free tab 42. On the other side, the composite portion 23 is bonded to the bottle neck 40.

Figure 3:
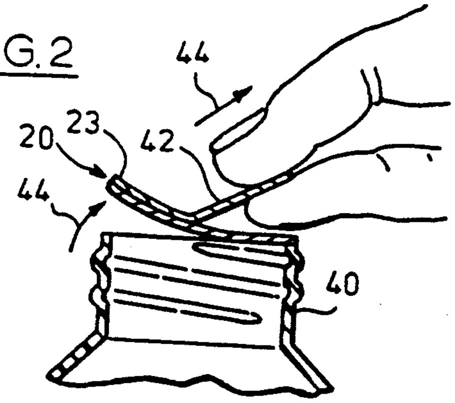
FIG. 3 is a sectional view of the neck of the container of FIG. 2, showing removal of the sealing member.

As shown in FIG. 3, the sealing member 20 can then be removed by grasping the tab 42. The tab 42 is grasped between two fingers and pulled in the direction of the arrows 44, i.e. the tab 42 is generally pulled laterally, rather than upwards. The composite portion 23 is them pulled from the bottle neck 40, commencing on the portion remote from the separated portion 24. Further pulling at the tab 42 causes complete detachment of the composite portion 23, followed by detachment of the separated portion 24, as the bond strength of the first layer of adhesive 10 is sufficiently great relative to the bond strength of the hot melt bonding material or adhesive 4 that the membrane 2 and first sheet 8 are removable as a unit, as shown.

The tab 42 is pulled laterally, to make full use of the bond provided by the first layer of adhesive 10. If the tab 42 is pulled upwards, or away from the separated portion 24, there may be a tendency for the first layer of adhesive 10 to separate, depending upon the nature of the various materials used and bond strengths of the adhesive layer 4, 10. Pulling laterally causes the sealing member 20 to separate from lip or the bottle neck 40, as a single unit, to leave the neck 40 fully open.

With the bottle open, it can be reclosed if desired, with the cap 30 in known manner.

The preferred materials for the sealing member 20 are as follows. For the membrane 2, aluminium foil having a thickness of 0.0015 inches is used. The hot melt bonding material is adhesive no. H0466 supplied by Industrial Adhesives. The first adhesive layer 10 is a composite adhesive, namely Spenbond adhesive 650/651, supplied by NL Chemicals; adhesive 650 is a water dispersed urethane-laminating adhesive, whilst 651 is a water dispersable curing agent for the adhesive. The first sheet 8 is a polyester, supplied by Dupont, having a thickness of 0.001 inches. The further adhesive layer is adhesive no. R0202, again supplied by Industrial Adhesives, this being a water born adhesive. Finally, the second sheet 14 is a bleached kraft paper having a thickness of 0.004 inches and a nominal weight of 52 pounds.

The top of the second sheet 14, which is formed from paper, is visible once the cap 30 has been removed from a bottle. Accordingly, it can be printed with suitable information. Thus, it can be printed with instructions, including arrows etc. indicating the direction in which the tab 42 is to be pulled. It can be printed with any other information desired, for example trade marks, logos, etc. identifying the product.

A preferred manufacturing sequence for producing the strips is as follows. For sealing members having a diameter of approximately $1\frac{7}{8}$ inches, a wide strip is produced having a width of $21\frac{7}{8}$ inches, including ten elongate strips 1. The wide strip is laminated together in the following sequence.

First, the first and second sheets 8, 14 are laminated together. This is achieved by applying adhesive in known manner to one of the sheets and then pressing these two sheets together. This forms the laminated sheet 6. The next step is to dry bond the laminated sheet 6 to the metal foil or membrane 2. This is achieved by applying Spenbond 650/651 adhesive to the laminated sheet 6 (or alternatively to the foil 2), and allowing it to dry until tacky. The membrane or metal foil 2 is then applied. Heat and pressure are then applied to the composite strip, to re-activate the glue and cause the membrane to become bonded to the laminate sheet 6.

Now, it is necessary for the Spenbond adhesive, forming the first adhesive layer 10 to be only applied in strips. This is achieved by using a specially formed roller. The roller essentially comprises raised parts, of constant radius, and slightly recessed parts. Only the recessed parts contact and transfer glue. A doctor blade wipes the adhesive of the raised parts so that they do not transfer any adhesive. Thus, a sheet passed across the roller receives strips of glue. The roller is so dimensioned as to apply the glue in the desired pattern.

The exposed surface of the membrane or foil 2 is then coated with a hot melt bonding material in the known manner.

The composite, wide strip is then formed. It is slit into the elongate strips 1 and printed. In a preferred embodiment, the wide strip having a width of $21\frac{7}{8}$ inches is slit into three intermediate strips each including three elongate strips 1, and a separate single elongate strip 1. These three elongate strips and the single elongate strip 1 are then printed, prior to slitting each of the intermediate strips into three elongate strips 1.

In known manner, the various steps are carried out on continuous lengths of the membrane 2 and first and second sheets 8, 14. In general, after each step, the strip formed was rewound, prior to carrying out the next step. However, with suitable equipment, it may well be possible to carry out the various steps as a continuous operation.

Once the elongate strips 1 have been formed, the sealing members 20 are cut from them by die-cutting so that the various layers have a common periphery. The dies are perfectly shaped, to cleanly ut the sealing members 20. Thus, the die is tapered and is deeper on the side for the separated portion 24.

Whilst the above description has been in relation to a circular sealing member 20, it is to be appreciated that many variations of the invention are possible. Thus, the sealing members need not necessarily be circular, but can be a variety of shapes, eg. a rounded rectangle, depending upon the nature of the container and the shape of its opening. Additionally, the provision of the second sheet 14 and the corresponding layer of adhesive are not always necessary. For some uses, the single sheet 8 of polyester or the like may be suitable. The width of the composite portion 23 can be varied, depending upon the nature of the materials used, the shape of the opening, etc. In any event, the configuration should preferably be such as to ensure that the membrane 2 is always removed completely, rather than being torn and leaving parts of it in place. It is also possible that other combinations of materials could be used, depending upon the application.

Further, the tab free edge need not correspond exactly to the edge of the membrane. Instead, the tab can be made smaller and have various sizes.

The cap used need not be a screw or even a circular cap. It could have plain side walls and a variety of shapes.

The sealing member can be sealed to a container by a variety of different techniques, e.g. a hot plate rather than induction heating. Further, an adhesive that does not require heating could be used.

We claim:

1. A method of making an elongate strip for the production of a sealing member, the method comprising the steps of:

(a) applying a plurality of elongate strips of a first adhesive to one of a membrane and a first sheet;

(b) applying the membrane and the first sheet together, whereby they are bonded together by the strips of the first adhesive to form an elongate strip, having composite portions where the membrane and the first sheet are bonded together by the first layer of adhesive and at least one separated portion where the first sheet is free from the membrane;

(c) coating a side of the membrane remote from the first sheet with an additional layer of adhesive;

Wherein the first layer of adhesive bonds the first sheet and the membrane together so strongly that, for a sealing member cut from the resultant elongate strip and bonded to the lip of a container by the additional layer of adhesive, the first sheet and the membrane can be removed as a unit from the lip of the container to open the container.

2. A method as claimed in claim 1, wherein the first sheet and the membrane are both substantially continuous and have a generally common periphery, whereby sealing members cut from the resultant elongate strip have a substantially common periphery for the first sheet and the membrane.

3. A method as claimed in claim 1, wherein the first sheet is discontinuous, whereby sealing members cut from the elongate strip have a first sheet which does not have a completely common periphery with the membrane.

4. A method as claimed in claim 2 or 3, wherein the elongate strips of the first layer of adhesive are generally of uniform width with parallel edges and are parallel to one another.

5. A method of making an elongate strip for the production of a sealing member, the method comprising the steps of:

(a) applying a plurality of elongate strips of a first adhesive to one of a membrane and a first sheet, wherein the elongate strips of the first layer of adhesive are generally of uniform width with parallel edges and are parallel to one another;

(b) applying the membrane and the first sheet together, whereby they are bonded together by the strips of the first adhesive to form an elongate strip, having composite portions where the membrane and the first sheet are bonded together by the first layer of adhesive and at least one separated portion where the first sheet is free from the membrane; and (c) coating a side of the membrane remote from the first sheet with an additional layer of adhesive.

6. A method as claimed in claim 5, wherein step (a) comprises applying a wide strip and a narrow strip of the first adhesive to one of the membrane and the first sheet, whereby following step (b), the elongate strip includes a wide composite portion and a narrow composite portion, with a central, separated portion therebetween, such that a sealing member cut from the wide composite portion and central separated portion will have a first sheet having one free tab.

7. A method as claimed in claim 5, wherein step (a) comprises applying a wide strip of the first adhesive, and on either side thereof two narrow strips of the first adhesive, whereby the following step (b), the elongate strip has a wide composite portion and two narrow composite portions on either side thereof and spaced therefrom by two separated portions, such that a sealing member cut from the wide composite portion and the separated portions on either side thereof will include two free tabs.

8. A method as claimed in claim 5, wherein step (a) comprises applying a plurality of wide strips of adhesive which are uniformly spaced apart and one narrow strip of the first adhesive adjacent the edge of the elongate strip, whereby the resultant elongate strip comprises a plurality of wide composite portions alternating with separated portions and a narrow composite portion adjacent one edge thereof.

9. A method as claimed in claim 8, wherein following step (c), the elongate strip is slit into a plurality of narrow elongate strips, with the wide composite portions being slit into major and minor parts, and each resultant narrow elongate strip comprising a major part of one composite portion and one of the minor part of a wide composite portion or said narrow composite portions.

10. A method as claimed in claim 9, wherein step (a) comprises applying ten wide strips of the first adhesive and said narrow strip of the first adhesive, wherein the elongate strip is first slit into a single narrow strip comprising the major part of a wide composite portion and the narrow composite portion, and three intermediate elongate strips of similar dimensions, each of which is subsequently slit into three narrow elongate strips.

11. A method as claimed in claim 1, 6 or 9, which includes the additional step of bonding a second sheet by a second layer of adhesive to the first sheet, on a side remote from the membrane, so as to form a laminated sheet.

12. A method as claimed in claim 1, 2, 3, 6 or 9, wherein the additional layer of adhesive comprises a hot melt bonding material which can be melted to bond a sealing member to the lip of a container.

13. A method as claimed in claim 1, 6 or 9, wherein the strips of the first adhesive are applied by means of a roller having raised parts and recessed parts, the recessed parts having a slightly smaller diameter than the raised parts, wherein the roller rotates and contacts one of the membrane and the first sheet, the first adhesive is continually applied to the surface of the roller, and a doctor blade removes the first adhesive from the raised parts, prior to contact with the first sheet or the membrane, whereby only the recessed parts apply the first adhesive in strips corresponding to the recessed parts onto the respective one of the membrane and the first sheet.

14. A method as claimed in claim 9, which includes the additional step:

(d) cutting sealing members from the elongate strip, by die cutting.

15. A method as claimed in claim 14, wherein each sealing member is cut from the elongate strip such that it includes a part of a composite portion and a part of a separated portion, the first sheet in the separated portion forming a tab.

16. A method as claimed in claim 15, wherein each sealing member is die cut by means of die that is tapered and is deeper on the side corresponding to the separated portion, so as to clean each sealing member.

17. A method as claimed in claim 10, wherein the strips of the first adhesive are applied by means of a roller having raised parts and recessed parts, the recessed parts having a slightly smaller diameter than the raised parts, wherein the roller rotates and contacts one of the membrane and the first sheet, the first adhesive is continually applied to the surface of the roller, and a doctor blade removes the first adhesive from the raised parts, prior to contact with the first sheet or the membrane, whereby only the recessed parts apply the first adhesive in strips corresponding to the recessed parts onto the respective one of the membrane and the first sheet.

18. A method as claimed in claim 1, 6 or 9, wherein the first sheet is formed of polyester and the membrane is formed from a metal foil.

19. A method as claimed in claim 15, wherein the first sheet is formed from polyester and the membrane is formed from a metal foil.

20. A method as claimed in claim 19, wherein the metal foil comprises aluminium foil having a thickness of 0.0015 inches and the polyester has a thickness of approximately 0.001 inches.

21. A method as claimed in claim 20, which includes the additional step of bonding a second, paper sheet having a thickness of approximately 0.004 inches to the first sheet on a side remote from the membrane, with a second layer of adhesive, to form a laminated sheet.

22. A method of making an elongate strip for the production of a sealing member, the method comprising the steps of:

(a) applying a plurality of elongate strips of a first adhesive to one of a membrane and a first sheet, the elongate strips being generally of uniform width and being parallel with one another;

(b) applying the membrane and the first sheet together, whereby they are bonded together by the strips of the first adhesive to form an elongate strip, having composite portions where the membrane and the first sheet are bonded by the first layer of adhesive and at least one separated portion where the first sheet is free from the membrane;

(c) coating a side of the membrane remote from the first sheet with an additional layer of a hot melt bonding material, which can be melted to bond a sealing member cut from the strip to the lip of the container; and (d) die cutting sealing members from the elongate strip, each of which sealing member includes a part of a composite portion and a part of a separated portion of the elongate strip, the first sheet in the separated portion of the sealing member forming a tab;

wherein the first layer of adhesive bonds the first sheet and membrane together so strongly that, for a sealing member cut from the resultant elongate strip and bonded to the lip of a container by the hot melt bonding material, the first sheet and the membrane can be removed as a unit from the lip of the container to open the container.

23. A method as claimed in claim 22, wherein step (a) comprises applying a plurality of wide strips of the first adhesive which are uniformly spaced apart and one narrow strip of the first adhesive adjacent the edge of the elongate strip, whereby the resultant elongate strip comprises a plurality of wide composite portions alternating with separated portions and a narrow composite portion adjacent one edge thereof, wherein prior to step (d) the elongate strip is slit into a plurality of narrow elongate strips, with the wide composite portions being slit into major and minor parts, and each resultant narrow elongate strip comprising a major part of one composite portion and one of the minor part of one wide composite portion and said narrow composite portion, and wherein step (c) comprises die cutting individual sealing members from each narrow elongate strip, with each sealing member being cut so as to extend into both the major part of the respective composite portion and the respective separated portion, without extending into said one of the minor part of a wide composite portion and said narrow composite portion.

* * * * *

UNITED STATES PATENT AND TRADEMARK OFFICE

CERTIFICATE OF CORRECTION

PATENT NO. : 5,261,990

DATED : Nov. 16, 1993

INVENTOR(S) : Galda, et al

It is certified that error appears in the above-identified patent and that said Letters Patent is hereby corrected as shown below:

Column 1, line 33, insert --)-- after "Kimsey";

column 7, line 29, replace "them" should by --then--;
column 7, line 31, replace "at" by --on--; and
column 7, line 45, replace "lip or" by --the lip of--.

column 9, line 31, replace "Wherein" by --wherein--;

column 10, line 36, replace "or said narrow composite portions" by --and said narrow composite portion--.

Signed and Sealed this

Sixth Day of September, 1994

Attest:

Bruce Lehman

BRUCE LEHMAN

*Attesting Officer*

*Commissioner of Patents and Trademarks*